United States Patent [19]

Wood

[11] Patent Number: 4,900,192
[45] Date of Patent: Feb. 13, 1990

[54] DOCK BOAT WELL PROTECTIVE BUMPER

[76] Inventor: James E. Wood, 24744 Orchid, Mt. Clemens, Mich. 48043

[21] Appl. No.: 250,217

[22] Filed: Sep. 28, 1988

[51] Int. Cl.[4] ............................................. E02B 3/22
[52] U.S. Cl. .................................. 405/215; 405/212; 405/211; 267/139
[58] Field of Search ................. 405/211, 212, 215, 70, 405/72; 114/219, 220; 403/331, 292, 339, 378, 379; 267/139, 140, 158; 293/155; 256/23, 62, 71

[56] References Cited

U.S. PATENT DOCUMENTS

| 276,679 | 5/1883 | Gier | 256/23 X |
|---|---|---|---|
| 488,217 | 12/1892 | Orr | 256/23 |
| 2,062,919 | 12/1936 | Maas | 114/219 |
| 2,578,291 | 12/1951 | Dickson, Jr. | 114/219 |
| 3,372,552 | 3/1968 | Liddell | 405/215 |
| 3,475,914 | 11/1969 | Porter | 405/215 |
| 3,486,342 | 12/1969 | Aks | 405/212 |
| 3,688,728 | 11/1972 | Lederer, Jr. | 114/219 |
| 3,906,732 | 9/1975 | Tedeschi, Jr. | 405/70 X |
| 3,948,473 | 4/1976 | Mason | 403/292 X |
| 4,292,913 | 10/1981 | Siebert et al. | 114/219 |
| 4,343,258 | 8/1982 | Belvedere | 114/219 |

FOREIGN PATENT DOCUMENTS

| 2725418 | 12/1978 | Fed. Rep. of Germany | 405/212 |
|---|---|---|---|
| 74419 | 5/1982 | Japan | 405/215 |

Primary Examiner—Randolph A. Reese
Assistant Examiner—J. Russell McBee
Attorney, Agent, or Firm—Basile and Hanlon

[57] ABSTRACT

A protective bumper includes an elongated, resilient, planar member, a slider slidably mounted on and slidably positionable along the length of the planar member and an adjustable length line with fasteners attached at opposite ends for suspending and attaching the slider and the planar member to a stationary dock piling. A plurality of like planar members are interconnected end to end via mating projections and sockets formed on the ends of each planar member.

16 Claims, 2 Drawing Sheets

DOCK BOAT WELL PROTECTIVE BUMPER

BACKGROUND OF THE INVENTION

1. Field of the Invention:

This invention relates to mooring bumpers and fenders.

2. Description of the Prior Art:

Mooring bumpers and fenders have been employed to protect deck pilings and piers as well as the sides of boats from damage caused by inadvertent contact of the boat with the piling as the boat enters a boat well or while the boat is moored in the boat well.

Typically, an elongated, wooden plank is attached to the piling above water level and extends the entire length of the boat well to distribute any force of impact by a boat along the entire length of the plank rather than on a single piling. This is done to prevent damage to the piling and to the sides of the boat itself. However, such planks are heavy and lack sufficient cushioning characteristics to absorb impact without damage to the boat. Further, unless other protective measures are taken, such wooden planks are susceptible to deterioration due to exposure to the wet marine environment thereby requiring frequent replacement.

To overcome these problems, it has been proposed to construct such bumpers from resilient material, such as rubber, etc. Attachment of such bumpers to dock pilings or piers is achieved by means of lines or ropes which are secured at one end to each piling and either tied around the bumper or secured through a bore formed at predetermined locations in the bumper and knotted at one end. However, the spacing between pilings is not always uniform such that the connection to the bumpers may vary from dock to dock thereby requiring a bumper to be specifically constructed for each particular dock.

Variable length bumpers formed of a plurality of interconnectable, identical members have also been proposed. However, such variable length bumpers are mounted on the boat rather than the dock and require time consuming assembly and positioning on the boat each time the boat approaches a dock.

Thus, it would be desirable to provide a marine bumper which overcomes the deficiencies encountered in previously devised marine bumpers. It would be desirable to provide a marine bumper which can be easily constructed in any length to suit any length of dock or boat well. It would also be desirable to provide a protective marine bumper which is formed completely of waterproof materials for a long, useful life. It would also be desirable to provide a marine bumper which can be easily disassembled for storage in a compact form or for ease of transport. Finally, it would be desirable to provide a marine or dock well protective bumper which is resilient and yet strong enough to resist damage caused by impact of a boat thereon.

SUMMARY OF THE INVENTION

The present invention is a dock boat well protective bumper which provides a resilient surface for a dock piling or pier and which prevents damage to a boat or the dock piling itself caused by impact of a boat with the piling.

The protective bumper comprises an elongated, resilient planar member. Suspension means are provided for suspending the planar member at a predetermined position with respect to a support, such as a dock piling or pier. Finally, connector means are provided which are slidably mounted on the planar member and adjustably positionable along the length of the planar member for connecting the planar member to the suspension means.

In a preferred embodiment, the connector means comprises a pair of channels formed on opposite sides of the planar member which extend along the entire length of the planar member. A slider is formed with a central portion having two depending legs. Inwardly extending flanges are formed on the end of the legs and engage the channels on opposite sides of the planar member for slidably mounting the slider on the planar member. A hook is mounted on the central portion of the slider and is connectable to the suspension means.

The suspension means, in a preferred embodiment, comprises an adjustable length weather proof line or rope which is tied to a predetermined length and connected to the dock piling via a first hook and to the slider on the planar member via a second hook.

In one embodiment, a plurality of identical planar members are joined together by interconnecting means to form an elongated bumper. The interconnecting means comprises mating projections and sockets associated with the ends of each planar member. The length of the projections and sockets is sufficient to provide a secure interconnection between adjacent planar members which resists deformation under impact of a boat.

Each planar member, in one embodiment, may be provided with a projection at one end and a correspondingly shaped socket at the other end. Alternately, sockets may be formed at each end of each planar member with a plug complementary shaped to the sockets being removably insertable between the sockets of two adjacent planar members to join two planar members together. In yet another embodiment, the length of the bumper may be extended by means of an intermediate extension member in a form of an elongated planar member which is interconnectable to adjacent planar members via suitable interconnecting means in the form of mating projections and sockets.

The dock boat well protective bumper of the present invention provides many advantages over previously devised marine bumpers and fenders. The dock boat well protective bumper of the present invention is formed of a resilient, yet strong material which provides an effective protective barrier which resists deformation and damage caused by impact of a boat. The bumper of the present invention must also be provided in variable lengths via the use of an intermediate planar member so as to adapt the bumper to fit any length of a dock or boat well as well as other marine and non-marine applications. The dock boat well protective bumper of the present invention is easily assembled or disassembled for storage in a compact form when not in use or for easy transport. Finally, the dock boat well protective bumper of the present invention is completely formed of weather proof materials which resist corrosion or deterioration in a marine environment thereby providing a long useful life for the protective bumper.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
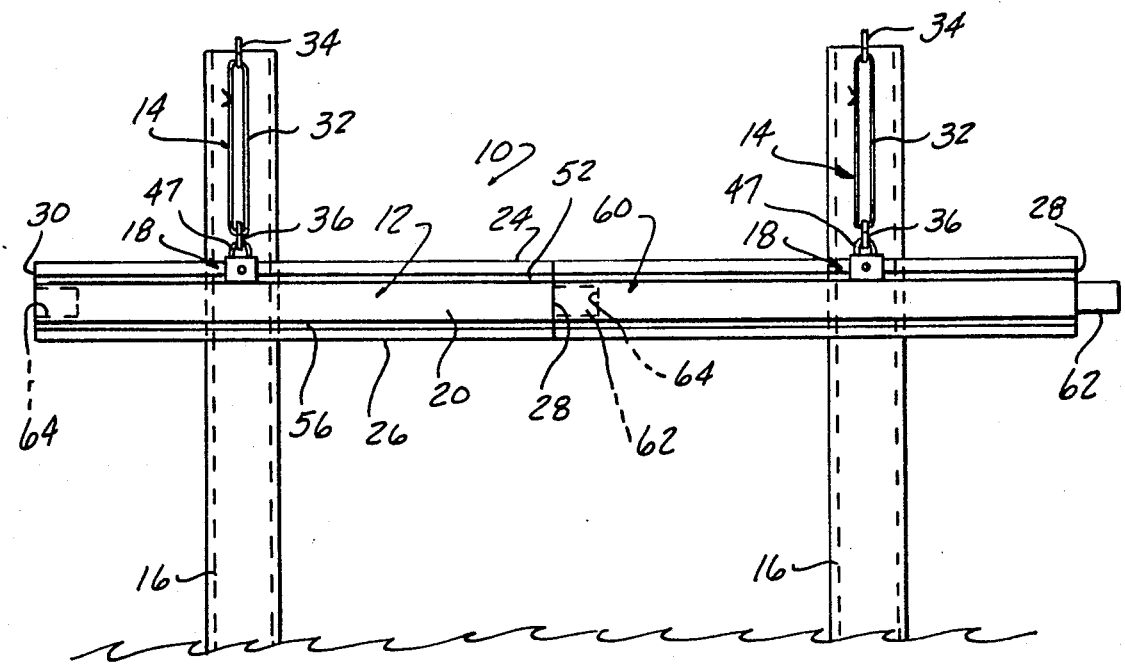
FIG. 1 is an elevational view of the dock well protective bumper of the present invention shown mounted on a dock boat well.

Throughout the following description and drawing, an identical reference number is used to refer to the same component shown in multiple figures of the drawing.

Referring now to the drawing, and in particular to FIG. 1, there is illustrated a dock boat well protective bumper denoted in general by reference number 10 which provides a protective surface between dock pilings or piers and boats and prevents damage to the boat or pier caused by impact of the boat on the pier or piling.

Figure 2:
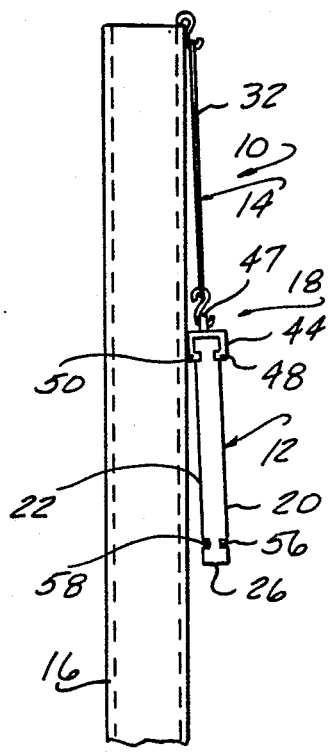
FIG. 2 is a side elevational view of the protective bumper shown in FIG. 1.
Figure 3:
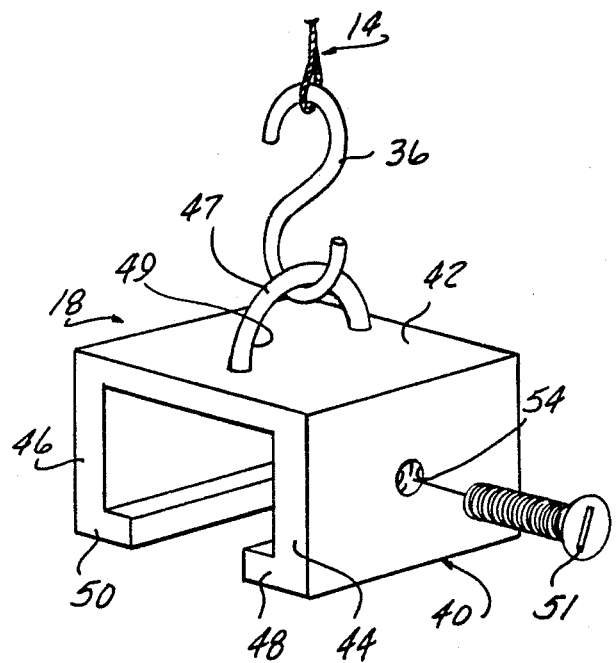
FIG. 3 is an enlarged, perspective view of the slider forming a part of the connector means of the protective bumper of the present invention.

As illustrated in FIGS. 1, 2 and 3, the dock boat well protective bumper 10 comprises an elongated planar member 12, suspension means denoted by reference number 14 for suspending the planar member 12 at a predetermined position with respect to a support, such as a dock piling or pier 16, and connector means 18, slidably mounted on the planar member 12 and adjustably positionable along the length of the planar member 12 for connecting the planar member 12 to the suspension means 14.

The planar member 12 has an elongated substantially rectangular shape of any desired length. For example, the planar member 12 may be formed with a seven foot length and a thickness of one inch. The planar member 12 is provided with opposed major surfaces 20 and 22, top and bottom ends 24 and 26, respectively, as viewed in the orientation shown in FIGS. 1, 2 and 4, and opposed side ends 28 and 30.

The planar member 12 is formed of any suitable, resilient, weather proof material which has sufficient strength to resist deformation upon impact. For example, the planar member 12 may be formed of any suitable plastic, such as an expanded synthetic resinous plastic sold under the trademark Styrofoam.

The suspension means 14 shown in FIGS. 1, 2 and 3 serves to connect the planar member 12 to the stationary support, such as a dock piling or pier 16. The suspension means 14 includes an adjustable length line or rope 32 which may be knotted to a predetermined length to position the planar member 12 at any height with respect to the pier 16 and the surface of the water. The suspension means 14 also include suitable fasteners for attaching one end of the line 32 to the pier or post 16 and another end to the connector means 18. In a preferred embodiment, the fasteners comprise S-hooks 34 and 36 which have one end insertable through the line 32 as shown in greater detail in FIGS. 2 and 3.

Currently, most piers or posts are formed of a hollow, tubular body such that the first S-hook 34 may be secured over the upper edge of the pier 16, as shown in FIGS. 1 and 2, to secure the suspension means 14 to the support post or pier 16. If the protective bumper 10 of the present invention is to be employed on piers or posts having another configuration, such as solid wooden pier, then a suitable connector, such as an eye hook, may be inserted into the pier 16 to provide a connection for the S-hook 34.

The connector means 18 in a preferred embodiment comprises an open-ended body 40 having a central portion 42 and two depending, opposed legs 44 and 46. The body 40 may be integrally formed, such as by molding, from a suitable weather proof material, such as a plastic. First and second flanges 48 and 50 extend inward from one end of the legs 44 and 46, respectively, into the hollow interior of the body 40.

Hook means 47, preferably in the form of a U-shaped tubular ring, is joined to or integrally formed on the central portion 42 of the body 40 and forms an opening 49. The hook means 47 is connectable to the fastener 36 to attach the connector means 18 to the suspension means 14.

Figure 4:
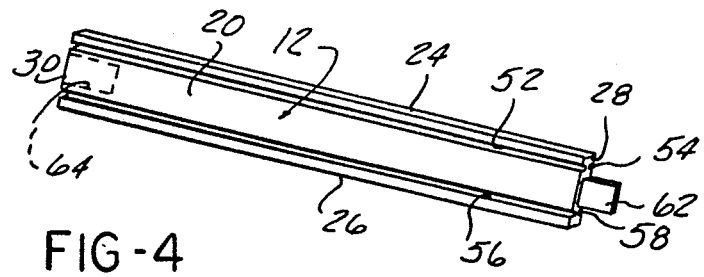
FIG. 4 is a perspective view of one embodiment of the planar member of the protective bumper shown in FIG. 1.

First and second channels 52 and 54 are formed in the planar member 12 adjacent one edge, such as the top edge 24 as shown in FIGS. 2 and 4. The channels 52 and 54 are aligned on the major surfaces 20 and 22, respectively, of the planar member 12 and extend substantially the entire length of planar member 12. The channels 52 and 54 are complimentary shaped to slidably receive the inwardly extending flanges 48 and 50 of the slider body 40 so as to enable the slider 40 to be slidably mounted on the planar member 12. In this manner, the slider 40 may be slidably positioned at any desired location along the length of the planar member 12 to provide suitable attachment to a support post or pier 16. Lock means 51 in the form of a set screw is provided for locking the slider 40 in a fixed position with respect to the planar member 12. The set screw 51 is insertable through an aperture 54 formed in one of the legs 44 or 46 of the slider 40 and frictionally engages the planar member 12 to lock the slider member 40 in a fixed position.

It should be noted that the channels 52 and 54 enable the planar member 12 to be positioned with respect to a stationary support post or pier 16 with either major surface 20 or 22 facing the support pier 16. Further, if it is desired, the orientation of the planar member 12 may be reversed to bring the outward facing major surface into registry with the pier 16.

In another embodiment, a second pair of opposed, aligned channels 56 and 58 are formed in the planar member 12 adjacent one edge, such as the bottom edge 26 shown in FIGS. 2 and 4. The channels 56 and 58 are identical to the channels 52 and 54 and enable the orientation of the planar member 12 to be inverted end to end.

It should be noted that when a single planar member 12 is mounted between two spaced piers 16, two connector means 18 formed of sliders 40 and associated suspension means 14 are required at opposite ends of the planar member 12. The sliders 40 are first positioned in the channels 52 and 54 on the planar member 12 and moved into alignment with a stationary support or pier 16. The suspension means 14 is then connected to the pier 16 and a slider 40 and tied at the desired length to position the planar member 12 at a predetermined height above the water level.

Although not shown, additional sliders 40 may be mounted in the lower most channels, 56 and 58 in the orientation shown in FIG. 2 and secured directly by lines to the pier 16 to secure the bottom of the planar member 12 flat against the pier 16.

As shown in FIG. 1, the protective bumper 10 of the present invention may also be constructed of a plurality of interconnected planar members, each identically constructed, such as planar members 12 and 60. Each planar member 12 and 60 is provided with a connecting means 18 and a suspension means 14. Further, interconnecting means in a form of mating, complimentarily shaped projections and sockets are formed in the ends of each planar member 12 and 16 to provide a releasable interconnection between the planar members 12 and 16 to form an elongated bumper. As shown in FIGS. 1 and 4, in one embodiment, each planar member, such as planar member 12, is formed with an outwardly extending projection 62 at one end 28. The projection 62 is preferably integrally formed with the main portion of the planar member 12 and has a length to slide within a complimentary shaped socket in an adjacent planar member 60 a sufficient distance to resist bending or deformation of the interconnected planar members 12 and 60 as described hereafter. A complimentary shaped socket 64 is formed in the opposed end 30 of the planar member 12 and is configured to slidably receive a mating projection 62 in another planar member. The planar members 12 and 60 are illustrated in FIG. 1 as being interconnected with the projection 62 of planar member 12 being slidably received within the socket 64 of the planar member 60.

In a preferred embodiment, the length of the projection 62 and the depth of each socket 64 is at least 6 inches to prevent sagging at the interconnection joint between two interconnected planar members as well as sideways bending under impact. It should also be clear that a cap sized to the size and shape of the socket 64 may be inserted into the socket 64 in the end most planar member 12 to close the socket 64.

Figure 5:
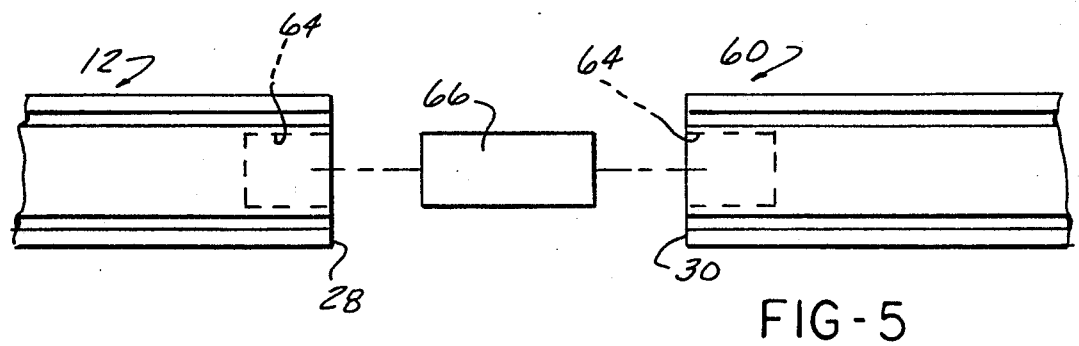
FIG. 5 is a partial, exploded view showing one embodiment of the interconnecting means of the protective bumper of the present invention.

In another embodiment illustrated in FIG. 5, the interconnecting means comprises a plug 66 which has substantially the same shape as the projection 62 shown in FIG. 4 but is constructed with twice the length of the projection 62. In this embodiment, each of the planar members 12 and 60 is provided with a socket a 64 at each end 28 and 30. The plug 66 is slidably received in each of the sockets 64 in the planar members 12 and 60 to interconnect the adjacent ends of the planar members 12 and 60 securely together.

Figure 6:
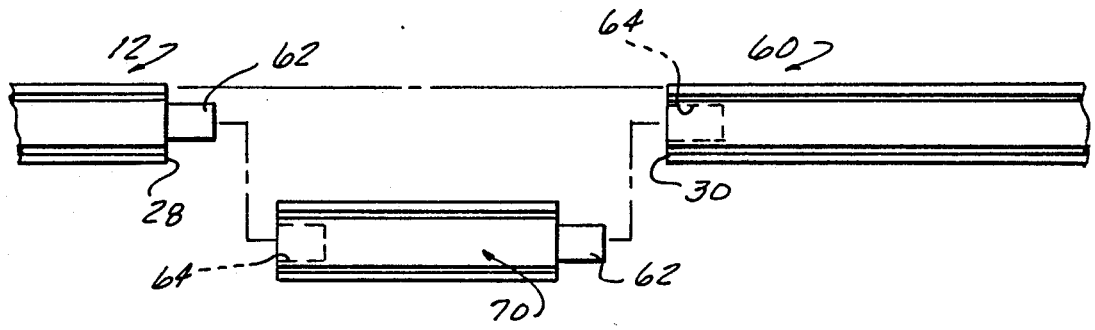
FIG. 6 is a partial, exploded view showing the use of the extender member.

As dock boat wells have piers or posts disposed at various unequal spacings, a situation may be encountered where the spacing between two adjacent piers 16 is too large for two planar members 12 and 60 to span the distance between the piers 16. In this situation, an extension member 70 shown in FIG. 6 may be employed. The extension member 70 may comprise one of the identically constructed planar members, such as planar member 12 and 60. Alternately, the extension member 70 may comprise a solid body of any length with the interconnecting projections 62 and sockets 64 formed at opposite ends. This enables the protective bumper 10 to be assembled in any desired length to span any length dock boat well.

Figure 7:
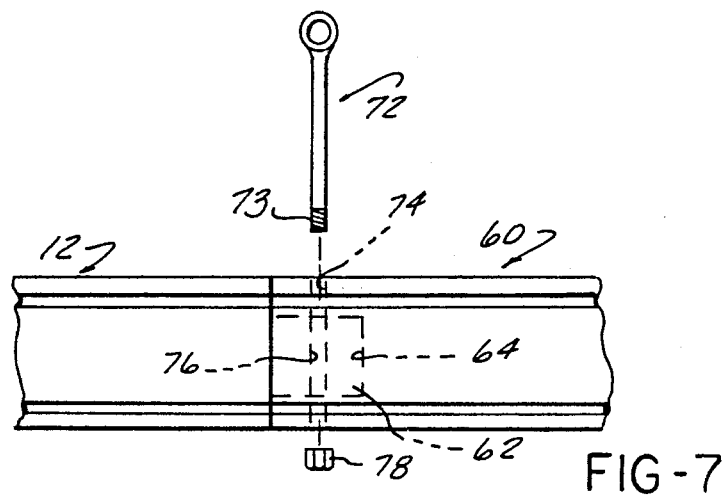
FIG. 7 is a partial, elevational view showing another embodiment of the interconnecting means of the present invention.

Additional support for the protective bumper 10 of the present invention may be required if the spacing between the adjacent piers 16 is large. In order to prevent sagging between interconnected planar members 12 and 60, a fastener 72, FIG. 7, in the form of a threaded screw or pin having a threaded end 73 is insertable through aligned bores 74 and 76 formed at opposite ends of the planar members 12 and 60. A nut 78 may be employed to securely fasten the screw or pin 72 through the interconnected portions of adjacent planar members 12 and 60. This provides additional support and strength for the bumper at the interconnection joint between adjacent planar members to prevent sagging as well as sideways bending of the planar members at the joint if struck by a boat. Alternately, an additional suspension means 14 and connector means 18 may be used with the extension member 70 if the extension member 70 is to be positioned adjacent a pier or piling 16.

In summary, there has been disclosed a unique dock boat well protective bumper which may be configured in any desired length to suit any dock or boat well dimension. The protective bumper is easily attachable to the dock piling or pier regardless of the spacing between adjacent pilings. The unique sliding connector means employed in the protective bumper of the present invention provides adjustable positioning without requiring modification of the protective bumper to suit a particular dock arrangement. The protective bumper of the present invention is constructed entirely of waterproof components for a long useful life and, further, may be easily disassembled into a compact form for storage or transport.

What is claimed is:

1. A protective bumper comprising:
   an elongated, resilient planar member;
   suspension means for suspending the planar member at a predetermined position with respect to a stationary support;
   connector means fixedly connected at a predetermined position along the length of the planar member for connecting the planar member to the suspension means;
   means for initially slidably mounting the connector means on the planar member; and
   means for locking the connector means in the fixed position on the planar member.

2. The bumper of claim 1 wherein the slidably mounting means comprises:
   a pair of channels formed on opposite sides of the planar member and extending along a substantial portion of the length of the planar member;
   a slider member having a central portion with two depending legs and inwardly extending flanges formed at the end of the legs and slidably engaging each channel to mount the slider member on the planar member; and
   hook means mounted on the slider member and connectable to the suspension means.

3. The bumper of claim 2 wherein:
   a pair of longitudinally extending channels are formed on both sides of the planar member.

4. The bumper of claim 1 wherein the suspension means comprises:
   an adjustable length line; and
   first and second fastening means attached to opposite ends of the line and respectively connected to the connector means and to the support for fastening the planar member to the support.

5. A dock boat well protective bumper mountable to a stationary dock boat well comprising:

an elongated, resilient planar member;
suspension means for suspending the planar member at a predetermined position with respect to the stationary dock boat well, the suspension means comprising an adjustable length line and first and second fastening means attached to opposite ends of the line; and
connector means fixedly connected at a predetermined position along the length of the planar member for connecting the planar member to the suspension means, the connector means comprising:
a pair of opposed channels formed on the planar member and extending substantially the entire length of the planar member;
a slider member having a central portion and two depending legs;
a pair of inwardly extending flanges formed at the end of each leg of the slider member and slidably engageable with the channels to mount the slider member on the planar member;
lock means for locking the slider member in a fixed position on the planar member; and
hook means mounted on the slider member and connected to one of the fastening means.

6. A protective bumper comprising:
a plurality of elongated, resilient planar members;
suspension means, associated with each planar member, for suspending each planar member at a predetermined position with respect to a stationary support;
connector means fixedly connected at a predetermined position along the length of each planar member for connecting each planar member to an associated suspension means;
means for initially slidably mounting the connector means on the planar member;
means for locking the connector means in the fixed position on the planar member; and
means for interconnecting the ends of each planar member.

7. The bumper of claim 6, wherein the interconnecting means comprises:
mating, complimentary shaped projections and sockets formed on opposite ends of the planar members.

8. The bumper of claim 6 wherein the interconnecting means comprises:
an outwardly extending projection formed at one end of each of the planar members; and
a mating, complimentary shaped socket formed on the other end of each of the planar members and releasably engageable with the projection of another planar member.

9. The bumper of claim 6 wherein the interconnecting means comprises:
inwardly extending sockets formed on the ends of each planar member; and
a plug complimentary shaped to and insertable within the sockets of two adjacently disposed planar members to join two adjacently disposed planar members together.

10. The bumper of claim 6 further including:
an intermediate, planar, resilient, extension member; and
means for interconnecting the extension member to and between two planar members.

11. The bumper of claim 6 further including:
pin means insertable through the interconnected ends of two planar members.

12. The bumper of claim 6 wherein the slidably mounting means comprise:
a pair of channels formed on opposite sides of the planar member and extending along a substantial portion of the length of the planar member;
a slider member having a central portion and two depending legs, a pair of inwardly extending flanges formed at the end of the legs and slidably engaging each channel to mount the slider member on the planar member; and
hook means mounted on the slider member and connectable to the suspension means.

13. The bumper of claim 6 wherein:
a pair of longitudinally extending channels are formed on both sides of the planar member.

14. The bumper of claim 6 wherein the suspension means comprises:
an adjustable length line; and
first and second fastening means, attached to opposite ends of the line, and respectively connected to the connector means and to a stationary support.

15. A dock boat well protective bumper mountable to a stationary dock boat well comprising:
a plurality of like, elongated, resilient planar members;
interconnecting means for releasably interconnecting the ends of the planar members, the interconnecting means comprising a projection formed on one end of each planar member and a mating, complimentary shaped socket formed on the opposite end of each planar member and matingly receiving a projection of an adjacent planar member;
a pair of opposed, aligned channels formed on each planar member adjacent one longitudinal edge of each planar member;
a slider member slidably mounted on certain of the planar members and having a central portion spanning the width of the planar members and two depending legs extending therefrom, an inwardly extending flange formed on the end of each leg of the slider member and slidably engageable with the channels to slidably and fixedly mount the slider member on the planar member;
a hook mounted on each slider member;
lock means for locking the slider member in a fixed position on the planar member; and
suspension means associated with each slider member for attaching each slider member to the stationary dock boat well, the suspension means comprising:
an adjustable length line;
first and second fastening means attached at opposite ends of the adjustable length line and respectively connected to the stationary dock boat well and the hook on the slider member.

16. The bumper of claim 15 wherein a projection is formed on one end of each planar member and a mating, complimentary shaped socket is formed on the opposed end of each planar member.

* * * * *